(12) United States Patent
Goslin et al.

(10) Patent No.: US 10,317,988 B2
(45) Date of Patent: Jun. 11, 2019

(54) COMBINATION GESTURE GAME MECHANICS USING MULTIPLE DEVICES

(71) Applicant: Disney Enterprises, Inc., Burbank, CA (US)

(72) Inventors: Michael P. Goslin, Sherman Oaks, CA (US); Joseph L. Olson, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 52 days.

(21) Appl. No.: 15/424,655

(22) Filed: Feb. 3, 2017

(65) Prior Publication Data

US 2017/0220104 A1 Aug. 3, 2017

Related U.S. Application Data

(60) Provisional application No. 62/290,851, filed on Feb. 3, 2016.

(51) Int. Cl.
*G06F 3/01* (2006.01)
*A63B 24/00* (2006.01)
(Continued)

(52) U.S. Cl.
CPC .......... *G06F 3/011* (2013.01); *A63B 24/0006* (2013.01); *A63B 24/0087* (2013.01); *A63B 71/0622* (2013.01); *A63F 13/211* (2014.09); *A63F 13/525* (2014.09); *A63F 13/5375* (2014.09); *G06F 3/017* (2013.01);
(Continued)

(58) Field of Classification Search
None
See application file for complete search history.

(56) References Cited

U.S. PATENT DOCUMENTS

| | | | | |
|---|---|---|---|---|
| 2009/0238378 | A1* | 9/2009 | Kikinis et al. | H04R 3/00 381/92 |
| 2012/0274583 | A1* | 11/2012 | Haggerty | G06F 3/041 345/173 |
| 2015/0310656 | A1* | 10/2015 | Otto et al. | G06T 13/40 345/420 |

OTHER PUBLICATIONS

Nathie ("Cast Virtual Spells with Your Hands—Warlock VR", Jan. 18, 2016, https://www.youtube.com/watch?time_continue=22&v=3LY1llAol2A).*

(Continued)

*Primary Examiner* — Xin Sheng
(74) *Attorney, Agent, or Firm* — Patterson + Sheridan, LLP

(57) ABSTRACT

Embodiments provide techniques for altering a virtual world based on combinational input gestures. Embodiments retrieve a definition for a combinational gesture within a computer game, the definition specifying physical actions to perform according to a specified timing schedule in order to successfully perform the combinational gesture. User activity is monitored to detect when a first user input from a first input devices sufficiently matches a first predefined pattern of user input corresponding to a first physical action, and to detect when a second user input from a second input device sufficiently matches a second predefined pattern of user input corresponding to a second physical action. Embodiments determine that the first and second user inputs were performed according to the timing schedule specified in the definition. A status of at least one aspect of a virtual world for the computer game is altered, based on performance of the combinational gesture.

18 Claims, 10 Drawing Sheets

(51) Int. Cl.

| | | |
|---|---|---|
| *A63B 71/06* | (2006.01) | |
| *G06T 19/00* | (2011.01) | |
| *G06T 19/20* | (2011.01) | |
| *G06T 7/292* | (2017.01) | |
| *A63F 13/211* | (2014.01) | |
| *A63F 13/525* | (2014.01) | |
| *A63F 13/5375* | (2014.01) | |

(52) U.S. Cl.
 CPC ............ *G06T 7/292* (2017.01); *G06T 19/006* (2013.01); *G06T 19/20* (2013.01); *A63B 2024/0078* (2013.01); *A63B 2024/0096* (2013.01); *A63B 2071/0625* (2013.01); *A63B 2071/0636* (2013.01); *A63B 2071/0638* (2013.01); *A63B 2071/0655* (2013.01); *A63B 2220/12* (2013.01); *A63B 2220/17* (2013.01); *A63B 2220/40* (2013.01); *A63B 2220/803* (2013.01); *A63B 2220/806* (2013.01); *A63B 2220/807* (2013.01); *A63B 2220/808* (2013.01); *A63B 2225/50* (2013.01); *A63B 2230/06* (2013.01); *A63B 2230/60* (2013.01)

(56) References Cited

OTHER PUBLICATIONS

MrRadiss ("Skyrim: Slow Time Spell", 2012, https://www.youtube.com/watch?v=ZT4FxdTy1Zg).*
NetHack ("Spellbook of slow monster", 2015, https://nethackwiki.com/wiki/Spellbook_of_slow_monster).*
Boumans ("Augmented Reality Mirror Game", 2015, Delft University of Technology).*

\* cited by examiner

COMBINATION GESTURE GAME MECHANICS USING MULTIPLE DEVICES

CROSS-REFERENCE TO RELATED APPLICATIONS

This application claims benefit of U.S. provisional patent application Ser. No. 62/290,851, filed Feb. 3, 2016, which is herein incorporated by reference in its entirety.

BACKGROUND

Field of the Invention

The present invention generally relates to entertainment systems, and more specifically to techniques for tracking combinational gestures in a gaming environment.

Description of the Related Art

Computer graphics technology has come a long way since video games were first developed. Relatively inexpensive 3D graphics engines now provide nearly photo-realistic interactive game play on hand-held video game, home video game and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Modern technologies such as augmented reality devices enable game developers to create games that exist outside of traditional video game platforms (e.g., where the virtual world is solely output through a display device). Using such technologies, virtual characters and other virtual objects can be made to appear as if they are present within the physical world. In such augmented reality experiences, it is generally preferable for the virtual character to be rendered with realistic dimensions and positioning, in order to enhance the illusion that the characters are truly present within the physical world.

SUMMARY

Embodiments provide a method, non-transitory computer-readable medium and system for tracking combinational gestures for a computer game. The method, non-transitory computer-readable medium and system include retrieving a definition for a combinational gesture within a computer game, the definition specifying two or more physical actions that are performed according to a specified timing schedule in order to successfully perform the combinational gesture. The method, non-transitory computer-readable medium and system also include monitoring user activity using two or more input devices. Additionally, the method, non-transitory computer-readable medium and system include detecting a first user input from a first of the two or more input devices sufficiently matches a first predefined pattern of user input corresponding to a first one of the two or more physical actions. The method, non-transitory computer-readable medium and system further include detecting a second user input from a second of the two or more input devices sufficiently matches a second predefined pattern of user input corresponding to a second one of the two or more physical actions. The method, non-transitory computer-readable medium and system include determining that the first and second user inputs were performed according to the timing schedule specified in the definition. The method, non-transitory computer-readable medium and system also include altering a status of at least one aspect of a virtual world for the computer game, based on performance of the combinational gesture.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Generally, embodiments described herein provide techniques for synchronizing input devices in an augmented reality gaming experience. For instance, according to one embodiment, user gestures are detected based on the inputs of a combination of different physical devices. As an example, one embodiment provides a toy sword device and a "force band" fitness device through which a user can perform combination gestures to affect a gaming environment. For example, in such an environment, a controller component could monitor sensor inputs of the various devices to determine when the inputs from both devices satisfy a predefined pattern. For instance, the toy sword device and the fitness device could each include sensor devices such as an accelerometer, an inertial measurement unit, a camera sensor, and so on. The controller component could monitor the data measured by these sensors to determine when the data matches a predefined pattern of data, indicative of a user successfully performing a combination gesture using the devices. As an example, such a gesture could require the user to perform a block movement with the toy sword device, while performing a pushing movement with the hand wearing the fitness device. More generally, however, any measureable gestures can be used, consistent with the functionality described herein.

Upon determining that the user has successfully performed the combination gesture, the controller component could affect the gameplay experience in a predefined manner based on the gesture that was performed. For instance, the user could be tasked with successfully blocking incoming ray blasts using the laser sword toy device, while blasting storm troops using a telekinetic ability with the user's other hand. Upon successfully completing the combination gesture, the controller component could provide the user with an in-game reward such as experience points or unlocking new in-game abilities. Advantageously, by tracking the inputs of two or more devices, embodiments enable the detection of more complicated user gestures, thereby enhancing the immersiveness and realism of the gaming environment.

Figure 1:
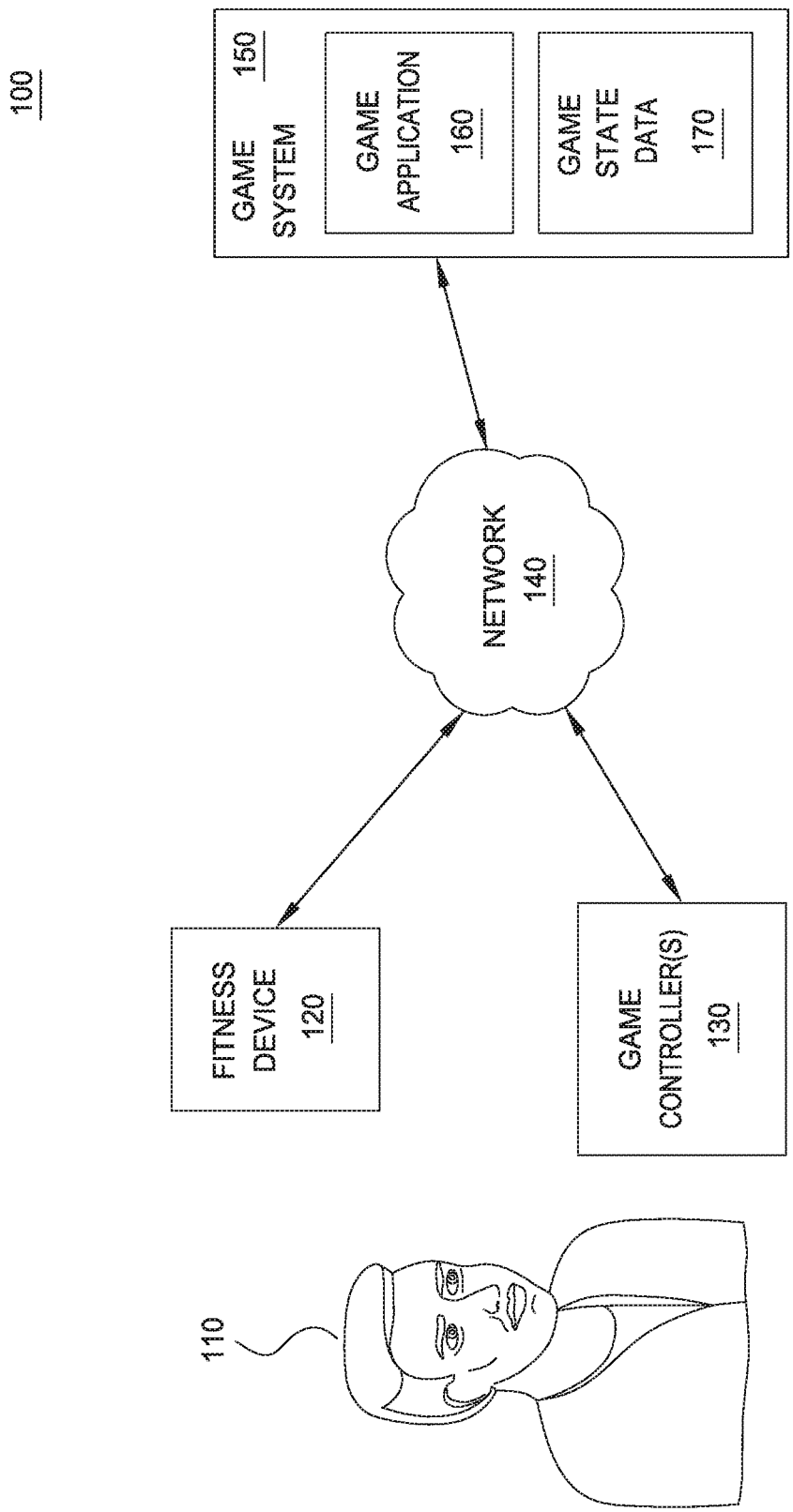
FIG. 1 illustrates a playtime environment in which a controller is instructing interactive devices, according to one embodiment described herein.

FIG. 1 illustrates an environment in which a user interacts with a game system using electronic devices, according to one embodiment described herein. As shown, the environment 100 includes a user 110, a fitness device 120, game controller(s) 130, and a game system 150, interconnected via a network 140. The game system 150 includes a game application 160 and game state data 170. Generally, the game application 160 represents a software application for a computer game with one or more physical world fitness objectives. The game state data 170 generally represents data maintained by the game application 160 for users playing the computer game. For example, the game state data 170 could specify information describing a user avatar (e.g., the avatar's appearance, obtained items, level, special abilities, attributes, etc.) within the computer game. Generally, the game controller(s) 130) represents an input device through which the user can provide inputs for controlling the game application 160.

The fitness device 120 represents a device capable of monitoring physical activity of the user 110. For example, the fitness device 120 could include one or more sensor devices such as accelerometers, IMU sensors, EMG sensors, heart rate sensors, and so on. In one embodiment, the fitness device 120 is configured to be worn by the user 110. For example, the fitness device 120 could be fitted with a clasp that the user can attach to, e.g., an article of clothing. In one embodiment, the fitness device 120 is configured to be worn by the user 110 (e.g., on the user's wrist as a bracelet or watch). More generally, the fitness device 120 represents any device with sensors (or capable of communicating with sensors) capable of monitoring fitness metrics of a user.

Additionally, the game controllers 130 represent devices through which the user can provide inputs which are used to control aspects of the computer game provided by the game application 160. For example, a game controller 130 could comprise a toy sword fitted with sensor devices such as IMU sensors and accelerometers, and the game application 160 can analyze data collected by the sensor devices to determine how the user is manipulating the toy sword.

In one embodiment, the game application 160 is configured to monitor input from the fitness device(s) 120 and game controller(s) 130 to determine when the user 110 successfully performs combinational gestures within the computer game. In one embodiment, the game application 160 retrieves a definition for a combinational gesture within a computer game, the definition specifying two or more physical actions that are performed according to a specified timing schedule in order to successfully perform the combinational gesture. For example, a particular computer game could task the user 110 with performing a sequence of movements, where the user must perform a first physical action by using a toy sword game controller 130 to deflect a virtual laser blast within the computer game (e.g., shown on an augmented reality display viewed by the user) and, after deflecting the virtual laser blast, must perform a second physical action by performing a particular gesture corresponding to a telekinetic ability within the computer game.

The game application 160 could then monitor the user's activity using two or more input devices. For example, the game application 160 could monitor sensor data collected by sensors within the toy sword game controller 130 to determine when the user has successfully performed the first physical action, and the game application 160 could monitor a fitness band worn by the user containing electromyography (EMG) sensors to determine when the user has successfully performed the particular gesture. In doing so, the game application 160 may retrieve predefined patterns of user input for the various sensors used to monitor the user's activity, and can compare sensor data collected by the sensor devices within the predefined patterns of user input to determine when the user performs the various physical actions. For example, the game application 160 could analyze sensor data collected from an IMU sensor within the toy sword game controller 130 to determine when the sensor data matches a predefined pattern of IMU sensor data indicative of the user swinging the game controller like a sword. Such a predefined pattern of sensor data could be determined, for example, by analyzing a training data set collected from users performing the gesture (e.g., swinging the toy sword game controller). The game application 160 could determine a confidence measure indicating how similar the collected sensor data is to the predefined pattern of sensor data, and if the confidence measure exceeds a predefined threshold level of confidence, the game application 160 could determine the user has successfully performed the gesture of swinging the toy sword.

In an embodiment where the user is tasked with deflecting a virtual laser blast, the game application 160 can consider timing and positional information of the virtual laser blast, in addition to timing information for the performed gesture of swinging the toy sword and positional information of the toy sword game controller 130. For example, the game application 160 could consider the position of the virtual laser blast, relative to the position of the toy sword game controller 130, at the time the gesture of swinging the toy sword was successfully performed. If the game application 160 determines that the positions are sufficiently close (i.e., based on a distance between the two three-space positions not exceeding a threshold measure of distance), the game application 160 could determine that the user has successfully deflected the virtual laser blast.

As another example, the game application 160 could analyze electromyograms collected from EMG sensors within the fitness band 120 to determine when the user has successfully performed the gesture corresponding to the kinetic ability. For example, the game application 160 could compare the electromyogram data collected by the fitness device 120 to determine whether the electrical activity of the user's muscles (as specified by the electromyogram data) sufficiently matches a predefined pattern of EMG data (e.g., determined based on a training set of data, collected while users repeatedly performed the gesture in question). The game application 160 could determine that the user has performed the gesture, for example, when the collected sensor data is sufficiently similar to the predefined pattern of sensor data (e.g., by determining that a difference between the collected sensor data and the predefined pattern of sensor data does not exceed a threshold level of difference).

In addition to determining whether the physical actions (e.g., swinging the sword, performing the gesture for the telekinetic ability, etc.) were successfully performed, the game application 160 can consider a time schedule specified in the definition for the combinational gesture. Generally, the time schedule specifies a required ordering (if any) and timing in which the various physical actions that make up the combinational gesture must be performed, in order to successfully perform the combinational gesture. For example, the time schedule could specify that the physical action of swinging the toy sword game controller 130 to deflect the virtual laser blast must be performed before the gesture corresponding to the telekinetic ability, and must further determine that the physical action and the gesture must be performed within a defined window of time of one another in order to successfully perform the combinational gesture.

Upon determining that the combinational gesture was successfully performed, the game application 160 could alter a status of at least one aspect of a virtual world for the computer game, based on performance of the combinational gesture. For example, the game application 160 could render one or more frames depicting the virtual laser blast being deflected by the toy sword, and depicting the telekinetic ability being used within the virtual world (e.g., by depicting a virtual object moving, in response to the use of the telekinetic ability). As another example, the game application 160 could reward the user with an in-game reward(s) upon the user successfully performing the combinational gesture. Such rewards could include, for example, a measure of experience points, a virtual item, a virtual ability, a virtual follower or pet, an in-game title and/or a virtual currency reward, within the computer game. As yet another example, the game application 160 could initiate performance of an in-game ability, responsive to the combinational gesture being performed. For instance, the game application 160 could initiate performance of a particular magical spell within the computer game, corresponding to the combinational gesture, upon the user successfully performing the combinational gesture.

Figure 2:
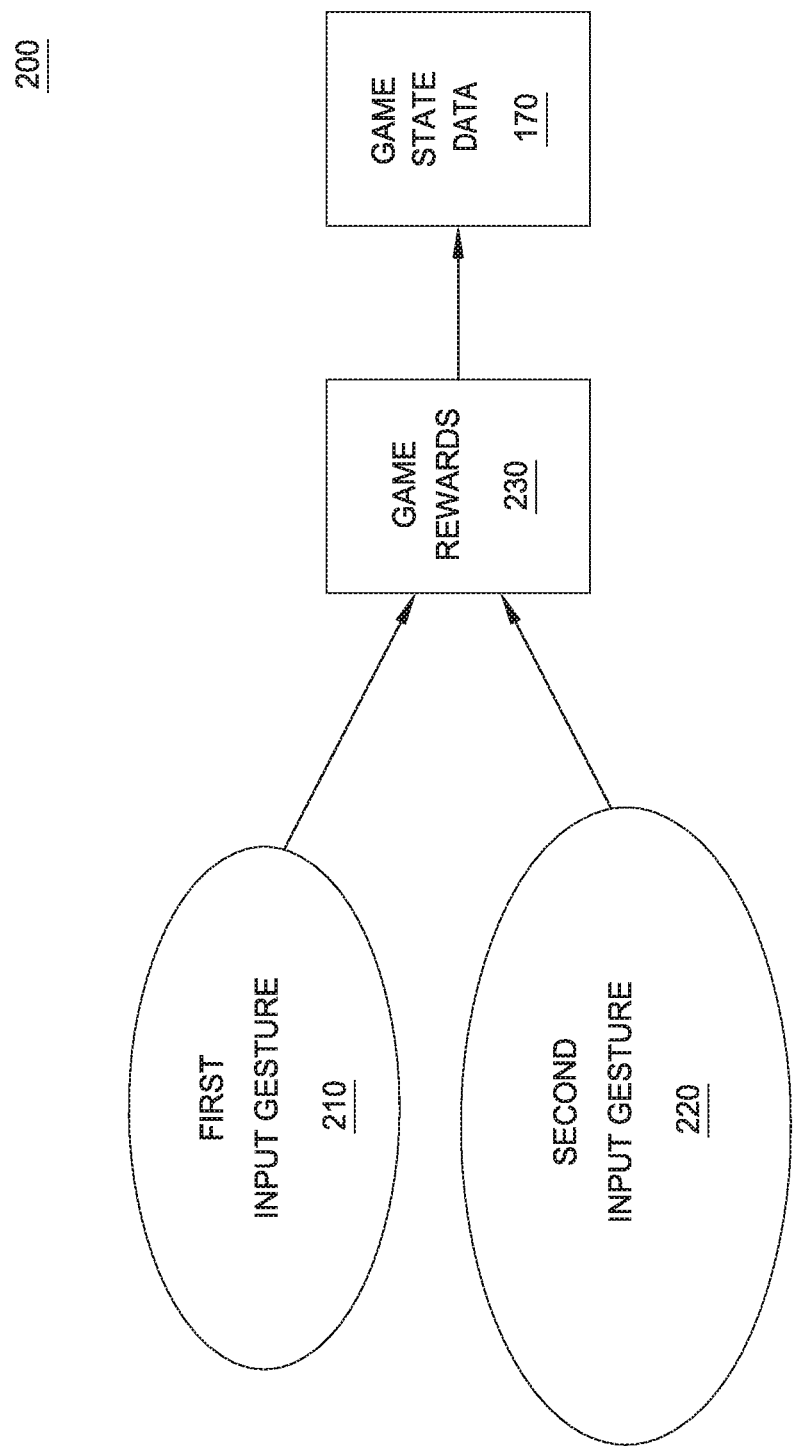
FIG. 2 is a flow diagram illustrating the use of combinational physical gestures in a computer game, according to one embodiment described herein.

FIG. 2 is a flow diagram illustrating the incorporation of combinational physical world gestures into a computer game, according to one embodiment described herein. As shown, the flow diagram includes a first input gesture 210, a second input gesture 220, game rewards 230 and game state data 170. As discussed above, the game state data 170 can include information for a user's avatar within a virtual world. Such information can include, for instance, attributes of the avatar, abilities of the avatar, an appearance of the avatar, and so on. In one embodiment, the user is requested to perform the combinational gesture as part of a task, quest, mission and the like that the user can complete within the virtual world. As shown, upon completion of the combinational gesture, the game application 160 can determine a corresponding game reward from the game rewards 230 and can update the game state data 170 to grant the determined game reward to the user. For instance, upon the completion of a particular combinational gesture, the game application 160 can determine a number of experience points having a predefined relationship with the gesture and can grant the experience points to the user's avatar. As an example, upon performing a combinational gesture in which the user deflects a virtual laser blast and then uses a telekinetic ability on a virtual character (e.g., an enemy within the virtual world), the game application 160 could grant the user an in-game reward for successfully completing the assigned task.

Particular embodiments are described herein with respect to an immersive storytelling environment in which a story is played back through the interaction of storytelling devices (also referred to as interactive devices). More specifically, embodiments may use various storytelling devices, each capable of producing some auditory and/or visual effect, to create an immersive and interactive storytelling experience for a user. Such a system may include a variety of storytelling devices and a controller, connected via a network (e.g., an RF communications network). Each storytelling device generally represents any device capable of enhancing a storytelling experience, in response to user input (or some stimuli) a current context of a story. For instance, the controller device could configure the storytelling devices with stimulus and response information, based on a current context of a story. As an example, the controller device could configure a particular storytelling device to generate audio-visual messages responsive to a certain stimulus event (e.g., a user performing a particular action), and to perform another action responsive to other stimulus (e.g., the user not performing the particular action within a predefined window of time). Generally, the controller may be one of the plurality of storytelling devices, or the controller could be a stand-alone device (e.g., a computing device executing a control application).

Additionally, embodiments can include augmented reality devices together with various storytelling devices as part of an augmented reality gaming environment. As used herein, an augmented reality device refers to any device capable of displaying a real-time view of a physical, real-world environment while altering elements within the displayed view of the environment. As such, unlike a virtual reality device which displays a view of virtual world, an augmented reality device displays a view of the real world but augments elements using computer graphics technology. Such an augmented reality device may include a camera device (or multiple camera devices) used to capture a view of the real-world environment and may further include computer software and/or hardware configured to augment elements of the captured scene. For example, an augmented reality device could capture a series of images of a coffee cup sitting on top of a table, modify the series of images so that the coffee cup appears as an animated cartoon character and display the modified series of images in real-time to a user. As such, when the user looks at the augmented reality device, the user sees an augmented view of the physical real-world environment in which the user is located.

Additionally, the game application 160 could identify a first physical object within the visual scene captured by camera devices of the augmented reality device. For instance, the game application 160 could analyze the visual scene to determine the border edges of objects within the visual scene, and could use these border edges in order to identify one or more physical objects existing within the visual scene. Of note, as the captured visual scene represents a three-dimensional space (e.g., a physical environment captured using a camera of the augmented reality device), the game application 160 may be configured to estimate a three-dimensional space occupied by each of the physical objects within the captured scene. That is, the game application 160 could be configured to estimate the three-dimensional surfaces of physical objects within the captured scene.

In response to detecting a known physical object with the visual scene, the game application 160 could render one or more virtual characters based on the physical object's appearance within the captured frames. As an example, the game application 160 could create a three-dimensional representation of the physical environment and could create a virtual object or character to insert within the three-dimensional representation. The game application 160 could position the created virtual object or character at a position within the three-dimensional scene, based on the depiction of the physical object within the captured frames. For example, the game application 160 could determine that the physical object is resting on a particular surface within the physical environment (e.g., a table surface, a floor, etc.), based on data about the size and shape of the physical object and the object's appearance within the captured frames. Upon identifying the physical surface, the game application 160 could position the virtual object or character within the three-dimensional scene, so that the virtual object or character is resting on the identified surface.

In doing so, the game application 160 could scale the size of the virtual object or character based on the depiction of the physical object within the captured frames. For instance, the game application 160 could store predefined geometric data for the physical object, specifying a shape and dimensions of the physical object. The game application 160 could then use such information to determine how to size the virtual object or character in the three-dimensional scene. For example, assume the virtual object is a spherical object that is 12 inches in diameter. The game application 160 could determine a scaling for the virtual object based on the size of the physical object within the captured frames and the predefined geometric data specifying the physical object's known dimensions. As another example, the game application 160 could create a virtual character and could scale the size of the virtual character to life-size dimensions (e.g., the size of an average human being), using the size of the physical object within the captured frames and the predefined geometric data specifying the physical object's known dimensions. Doing so enables the game application 160 to create a realistic and consistent depiction of the virtual object or character.

Generally, the game application 160 can continue rendering frames of the three-dimensional scene interlaced with the frames captured by the camera sensors of the augmented reality device, in real-time, as the device (and the user of the device) moves throughout the physical environment. Advantageously, doing so provides a more immersive augmented reality experience for the user, as the user can paint the surfaces of objects within the augmented reality world and the user's painting will persist and remain accurate to the depicted physical environment, even when the environment is viewed from different perspectives using the augmented reality device.

Figure 3:
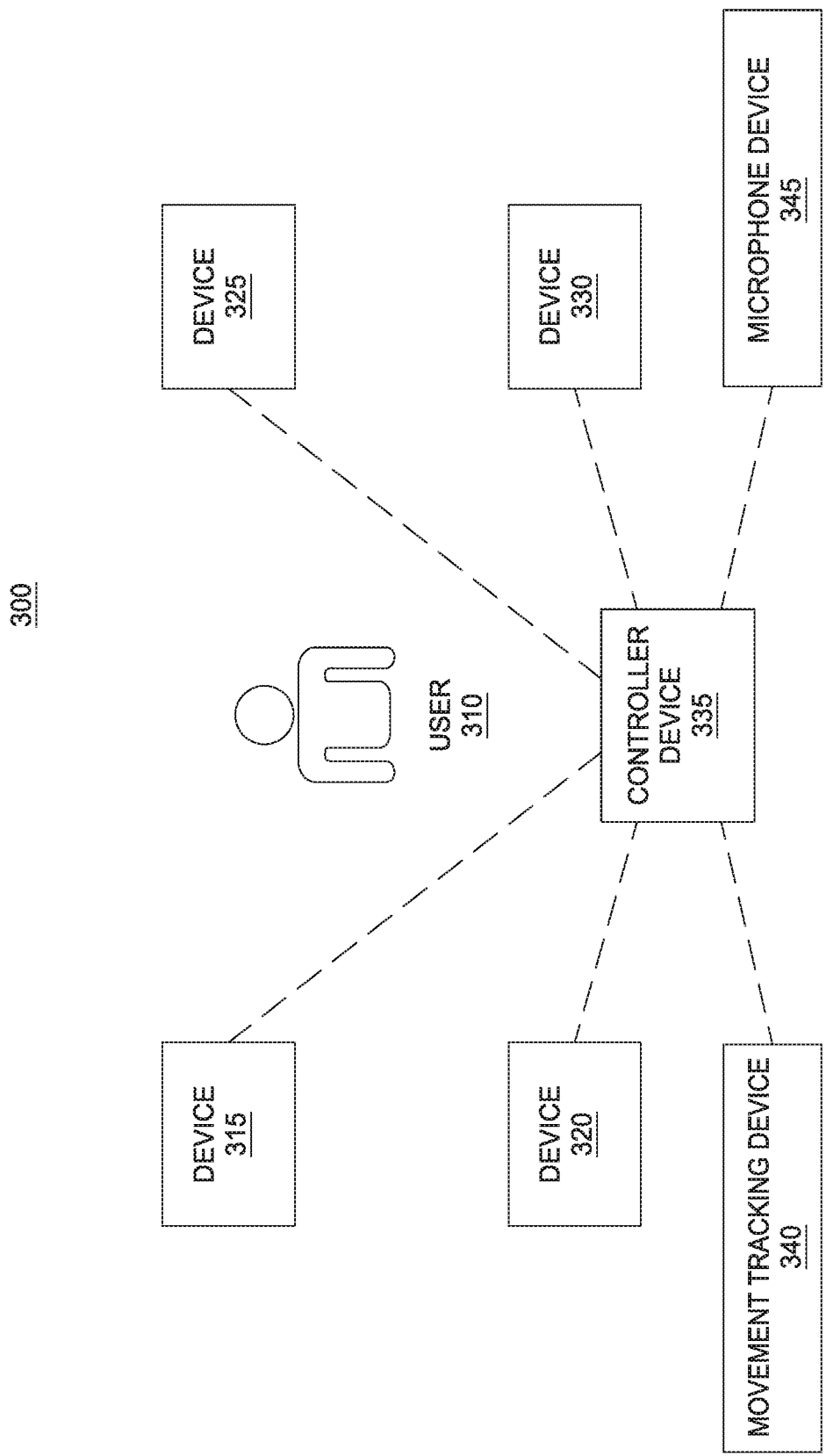
FIG. 3 illustrates a physical environment including storytelling devices and a user, according to one embodiment described herein.

FIG. 3 illustrates a physical environment including storytelling devices and a user, according to one embodiment described herein. As shown, the environment 300 includes a user 310 surrounded by a number of storytelling devices 315, 320, 325 and 335 as well as a control device 335. In one embodiment, the control device 335 represents the game system 150 on which the game application 160 is executing. Generally, embodiments described herein provide techniques for synchronizing input devices in an augmented reality gaming experience. For instance, according to one embodiment, the game application 160 can detect user gestures based on the inputs of a combination of different physical devices. As an example, one embodiment provides a toy sword device and a "force band" fitness device through which a user can perform combination gestures to affect a gaming environment. For example, in such an environment, the game application 160 could monitor sensor inputs of the various devices to determine when the inputs from both devices satisfy a predefined pattern. For instance, the toy sword device and the fitness device could each include sensor devices such as an accelerometer, an inertial measurement unit, a camera sensor, and so on. The game application 160 could monitor the data measured by these sensors to determine when the data matches a predefined pattern of data, indicative of a user successfully performing a combination gesture using the devices. As an example, such a gesture could require the user to perform a blocking movement with the toy sword device, while performing a pushing movement with the hand wearing the fitness device emulating a telekinetic power blast. More generally, however, any measureable gestures can be used, consistent with the functionality described herein.

Additionally, the game application 160 can determine when the user has correctly performed gestures using the multiple devices according to a particular timing schedule. For instance, the game application 160 could require the user to perform the aforementioned blocking action before performing the telekinetic power blast gesture to successfully perform the combination gesture. Additionally, the game application 160 could specify that the blocking and telekinetic blast gestures must be performed within a predefined window of time, in order to successfully perform the combination gesture.

The game application 160 can provide feedback through the various devices responsive to the user performing the combination gesture. For example, upon successfully blocking a virtual laser beam using the toy sword device, the game application 160 can instruct both the toy sword device and the fitness device 120 to provide haptic feedback emulating the block. For instance, in one embodiment, both the toy sword device and the fitness device 120 are in communications with the controller device 335 using Bluetooth Low Energy (BLE) communications. More generally, however, any communications protocol can be used, consistent with the functionality described herein.

In one embodiment, the game application 160 can perform a special attack within the augmented reality game responsive to the combination gesture being performed. For instance, a particular attack move within an augmented reality game could be executed when the user performs a combination gesture through the use of two or more devices.

In one embodiment, the game application 160 is configured to simulate a "time slowing" effect while the user performs the combination gestures. For example, the game application 160 could transmit instructions to an augmented reality device, specifying to render the augmented reality environment in slow motion. For instance, the game application 160 could output frames for display depicting the movement of virtual characters in slow motion and could further modify the sound effects of the augmented reality environment to be in slow motion. Doing so can provide the user with additional time in which to perform the combinational gesture, while giving the user the appearance of acting with super-human speed, thereby improving the immersiveness of the augmented reality environment.

In one embodiment, the game application 160 is configured to determine a position within the physical environment at which the blocking gesture will successfully block an incoming attack. Additionally, the game application 160 could instruct an augmented reality device within the physical environment to depict an incoming attack (e.g., a blast from a virtual laser rifle) as passing through the determined position within the physical environment. The game application 160 can control the toy sword device to further provide increasing amounts of haptic feedback, as the user moves the toy sword device closer to the determined position of the physical environment. For example, the game application 160 could transmit instructions to the toy sword device, causing the toy sword device to vibrate an amount that is inversely proportional to the distance between the toy device and the determined position. Thus, the game application 160 could cause the toy device to vibrate more when the toy device is closer to the determined position, and the game application 160 could cause the toy device to vibrate less when the toy device is further from the determined position. In one embodiment, the game application 160 is configured to provide increasing amounts of haptic feedback, as the user moves the toy device closer to the correct orientation. Doing so provides an additional method by which the user can ascertain the correct position for holding the toy device, which can help the user learn the augmented reality game and can also offset any inaccuracy in the positioning of the incoming attacks on the augmented reality display.

In one embodiment, the game application 160 is configured to process the inputs determined by the various toy devices in a secondary fashion. For example, in a particular augmented reality game, a toy sword device could primarily be used as a weapon within the augmented reality game, e.g., slashing at virtual enemies, blocking incoming attacks, and so on. However, for a portion of the augmented reality game, the game application 160 could instruct the user to use the toy sword device in a secondary fashion. As an example, the game application 160 could output audio and visual effects (e.g., using various toy devices and an augmented reality device within the physical environment) instructing the user that the user should invert the toy sword device and use the toy device as a steering wheel for a racing section of the augmented reality game. The game application 160 could then process the input data collected from the sensors in the toy sword device to control a vehicle (e.g., a speeder bike) within the augmented reality game. Doing so allows for the toy devices to serve multiple functions within the augmented reality game, thereby reducing the user's cost.

Additionally, the game application 160 could modify the behavior and appearance of the toy device when operating the toy device in a secondary fashion. For example, the game application 160 could transmit sound effects (e.g., depicting the engine noise of the vehicle) consistent with the secondary fashion to the toy device for output. As another example, the augmented reality device could augment the appearance of the toy device to depict the devise as visually consistent with the secondary use. For instance, where the toy sword device is used in a secondary fashion as a racing wheel, the augmented reality device could render frames depicting the toy sword device as a racing wheel, enhancing the user's illusion that the toy device is truly operating in the secondary fashion.

In addition to coordinating the devices 315, 320, 325, and 330, the control device 335 could control environmental devices (not shown) within the physical environment based on an environmental condition at a first playback position within an instance of audiovisual content. Generally, such environmental devices represent items within the physical environment. Examples of such devices include lighting fixtures, window cover mechanisms (e.g., automated mechanisms for adjusting window shades for windows within the physical environment), temperature control devices and so on. The game application 160 could perform an operation to determine which environmental devices are currently available within the physical environment (e.g., by carrying out a device discovery protocol over a data communications network).

In one embodiment, the game application 160 is configured to detect the performance of combinational gestures using the movement tracking device 340 and the microphone device 345. For example, a definition for a particular combinational gesture could specify that the user must first speak a particular phrase (e.g., representing casting a magical spell) and, within a period of time specified by a time schedule, must perform a particular gesture with the user's hands to successfully complete the combinational gesture. The game application 160 could then analyze sensor data collected by the microphone device 345 to determine when the user successfully speaks the particular phrase (e.g., by comparing the collected sensor data to a predefined pattern of sensor data), and could analyze sensor data collected by the movement tracking device 340 to determine when the user successfully performs the particular gesture (e.g., by comparing sensor data collected by the movement tracking device 340 with a predefined pattern of sensor data). Upon determining that the combinational gesture has been performed successfully, the game application 160 could alter one or more aspects of the gaming environment.

Additionally, upon successful performance of a combinational gesture, the game application 160 can transmit instructions (e.g., using a wireless data communication network) to control the behavior of the environmental devices, in a manner determined based on the combinational gesture. As an example, a particular combinational gesture could correspond to a brightness spell, upon successful performance of the gesture, the game application 160 could control one or more of the environmental devices to increase the brightness within the physical environment. For example, assume that the environmental device is a window cover mechanism. Upon determining that the brightness spell has been cast, and upon further determining that the sun is currently out in the geographic area in which the physical environment is located (e.g., by querying a remote weather server using a data communications network), the game application 160 could transmit an instruction to the environmental device in order to raise the covers on the windows, thereby letting more sunlight into the physical environment. Doing so allows the physical environment to dynamically adjust based on the performance of a combinational gesture within a computer game.

As another example, assume that the environmental device is a temperature control device (e.g., a WiFi-enabled thermostat, and standalone heating and/or cooling device, etc.). Upon determining that another combinational gesture corresponding to a frost bolt spell has been successfully performed, the game application 160 could transmit an instruction to the temperature control environmental device in order to decrease the temperature within the physical environment. Doing so allows the temperature of the physical environment to dynamically adjust to the current state of the computer game.

One embodiment includes an environmental device configured to provide a user experience of temperature changes within the physical environment, without altering the temperature throughout the entire physical environment. As an example, an environmental device could emit warmer or cooler air (i.e., relative to the ambient temperature of the physical environment) and could blow this air (e.g., using a fan or other suitable mechanism) in the direction of a user. Such an embodiment may be preferable over attempting to control the ambient temperature of the physical environment, as such a device can adapt more quickly to temperature variations. For instance, a user could perform a combinational gesture corresponding to a fireball super power being used, and a short time later, could perform a combinational gesture corresponding to a frost bolt super power being used. In such an example, a thermostat environmental device configured to control the ambient temperature of the physical environment may be unsuitable for such a situation, as such a device may not be able to alter the temperature of the ambient environment quickly enough.

Generally, embodiments can be deployed in a variety of different physical environments. For example, one embodiment is configured to be implemented within a user's home (or other residence). In such an embodiment, the environmental devices could include devices such as WiFi-equipped thermostat, automated window coverings (e.g., automated blinds), illumination devices (e.g., lighting devices configured with data communication links), display devices (e.g., WiFi-equipped television devices), audio devices (e.g., sound receivers) and so on. As another example, another embodiment is implemented within a vehicle. In such an embodiment, the environmental devices could include the vehicle's temperature control, window coverings, lighting devices within the vehicle, and so on. More generally, any physical environment suitable for carrying out the functionality described herein can be used, consistent with the functionality described herein.

Generally, the game application 160 can select two or more of the devices 315, 320, 325 and 330 to output a particular sound and can generate a schedule by which the selected devices should output the sound. For instance, such a schedule could specify that the selected devices should output the sound in unison or could specify that each of the selected devices should output the sound effect at a different point in time, so as to introduce a time delay between the audio output of each device.

For example, a particular story having a jungle theme could include ambient sound effects that simulate the sounds of a jungle, including birds chirping, insects buzzing, the sound of a distant waterfall, and so on. In outputting the ambient sound effects, the game application 160 could distribute the various sound effects across the devices 315, 320, 325 and 330 (with some potentially output by the game application 160 itself) and could generate a timing schedule by which the various sound effects should be played by the devices 315, 320, 325 and 330. For example, the schedule could specify that the sound effects should be temporally staggered (i.e., not all played at the same time) and could distribute the sound effects across the devices 315, 320, 325 and 330, so as to create a three-dimensional soundscape for the user 310.

Additionally, as discussed above, the game application 160 can consider the individual audio playback and processing capabilities of the devices 315, 320, 325 and 330 when distributing the sound effects, so as to optimize the distribution of the sound effects to the most appropriate device 315, 320, 325 and 330. For example, a first sound effect could correspond to the beat of jungle drums and could include significant low frequency sounds, while a second sound effect could correspond to the sound of a distant waterfall and includes primarily medium frequency sounds. As such, the game application 160 could assign the sound effect of the drum beat to one of the devices 315, 320, 325 and 330 having audio output capabilities best suited to playing low frequency sounds, and could assign the waterfall sound effect to a device with more limited audio playback capabilities that is better capable of playing the primarily mid-range sound effect. Advantageously, doing so allows the game application 160 to optimize the assignments of the individual devices when creating the soundscape for the user 310.

In one embodiment, the game application 160 is configured to consider the position of the user 310 relative to the position of the devices 315, 320, 325 and 330, when distributing and scheduling sound effects to the various devices 315, 320, 325 and 330. For instance, assume that a particular story takes place within a bee hive and includes ambient sound effects simulating bees flying all around the user 310. The game application 160 could consider the user's 310 position in distributing the ambient sound effects to the devices 315, 320, 325 and 330 for playback, so as to ensure the output of the sound effects creates an immersive and three-dimensional soundscape for the user. Thus, in this example, the game application 160 could schedule the sound of a bee buzzing to be output by each of the devices 315, 320, 325 and 330 with a time delay in between each output, so that the sound of the bee appears to repeatedly encircle the user 310 who is positioned roughly in between all of the devices 315, 320, 325 and 330.

Moreover, the game application 160 can be configured to dynamically update the playback schedule and the devices used in the playback in real-time, as the position of the user 310 and the various devices changes. For instance, as the devices move throughout the physical environment (e.g., when carried by a user, when moving on their own, etc.), the game application 160 could dynamically update the playback schedule of the bee buzzing sound effect to maintain the effect of the sound encircling the user 310. For example, a first sequential playback order for the bee buzzing sound effect could be devices 315, device 320, control device 335, device 330 and then device 325, which could repeat indefinitely provided the devices 315, 320, 325, 330 and 325 and the user 310 remain in their depicted positions. However, if as part of the story playback the devices 315 and 330 move throughout the physical environment and change positions, the game application 160 could update the sequential playback order to be device 330, device 320, control device 335, device 315 and then device 325.

Figure 4A:
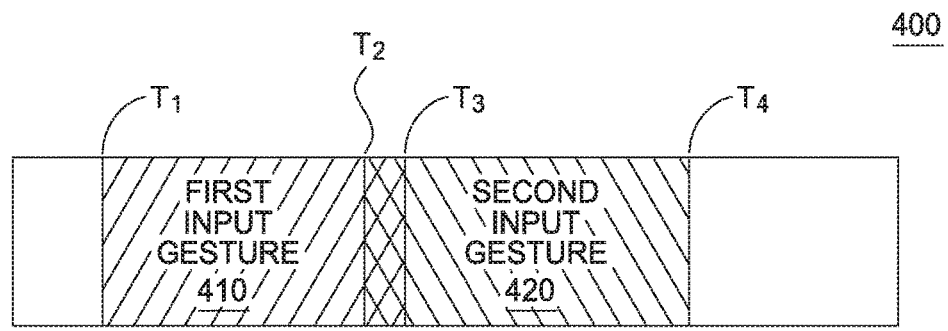
FIGS. 4A-C illustrate timing sequences for physical actions of a combinational input gesture, according to embodiments descried herein.
Figure 4B:
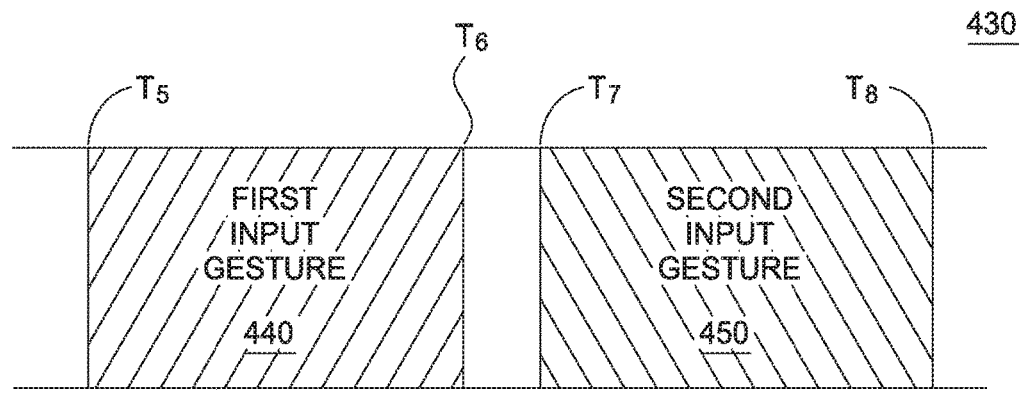
Figure 4C:
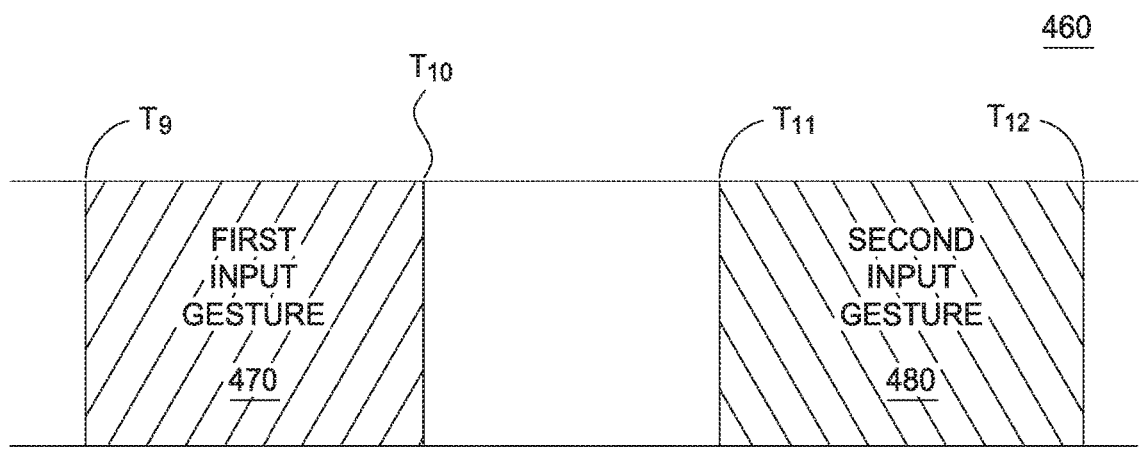

FIGS. 4A-C illustrate timing sequences for physical actions of a combinational input gesture, according to embodiments descried herein. As shown, FIG. 4A depicts a timing sequence 120, showing the timing of when a first input gesture 410 was performed and the timing of when a second input gesture was performed 420. In other words, the shaded region for the first input gesture 410 represents the window of time during which sensor data was collected that matches the predefined input pattern of sensor data for the first input gesture, and the shaded region for the second input gesture 420 represents the window of time during which sensor data was collected that matches the predefined input pattern of sensor data for the second input gesture. In the depicted example, the first input gesture 410 was performed from times $T_1$ to $T_3$, while the second input gesture 420 was performed from times $T_2$ to $T_4$. In such an embodiment, the game application 160 could determine that the first input gesture 410 completed at time $T_3$ and that the second input gesture 420 completed at time $T_4$. The game application 160 could compare the times $T_3$ and $T_4$ to determine a difference between the two moments in time, and could compare the determined difference to a threshold amount of time specified in the timing schedule for the combinational gesture being performed. Upon determining that the difference does not exceed the threshold amount of time, the game application 160 could determine that the combinational gesture has been successfully performed.

As another example, FIG. 4B shows a timing sequence 430 that depicts the timing of when a first input gesture 440 and a second input gesture 450 were performed. In the depicted example, the first input gesture 430 was performed from times $T_5$ to $T_6$, while the second input gesture 440 was performed from times $T_7$ to $T_8$. In such an embodiment, the game application 160 could determine that the first input gesture 430 completed at time $T_6$ and that the second input gesture 440 completed at time $T_8$. The game application 160 could compare the times $T_6$ and $T_8$ to determine a difference between the two moments in time, and could compare the determined difference to a threshold amount of time specified in the timing schedule for the combinational gesture being performed. Here again, upon determining that the difference does not exceed the threshold amount of time, the game application 160 could determine that the combinational gesture has been successfully performed.

However, in FIG. 4C, the game application 160 could determine that the first input gesture 470 and second input gesture 480 were performed sufficiently far apart (i.e., in time) as specified by the timing schedule, and thus the game application 160 could determine that the combinational gesture was not successfully performed, even though the sensor data collected by the input devices successfully matched the predefined patterns of sensor data. FIG. 4C is a timing sequence 460 that depicts the timing of when a first input gesture 470 and a second input gesture 480 were performed. In the depicted example, the first input gesture 470 was performed from times $T_9$ to $T_{10}$, while the second input gesture 480 was performed from times $T_{11}$ to $T_{12}$. In such an embodiment, the game application 160 could determine that the first input gesture 470 completed at time $T_9$ and that the second input gesture 480 completed at time $T_{12}$. The game application 160 could compare the times $T_{10}$ and $T_{12}$ to determine a difference between the two moments in time, and could compare the determined difference to a threshold amount of time specified in the timing schedule for the combinational gesture being performed. For example, upon determining that the time difference exceeds the threshold amount of time, the game application 160 could determine that the gesture was not successfully performed.

In one embodiment, the game application 160 is configured to consider the timing at which the gesture was performed, relative to a position of one or more virtual objects. For example, a particular combinational gesture may require the user to successfully deflect a virtual laser beam by performing a physical action using a toy sword input controller. In doing so, the game application 160 can determine a three-space position of the virtual laser beam, at the time the physical action was performed, and can compare the determined three-space position of the virtual laser beam with the toy sword's position. For example, the game application 160 could determine that the combinational gesture was not correctly performed, due to a determined position of a virtual object at the time at when one of the physical actions was performed, even though the physical actions were performed in a sufficiently correct manner and even though the physical actions were performed sufficiently close to one another.

Figure 5:
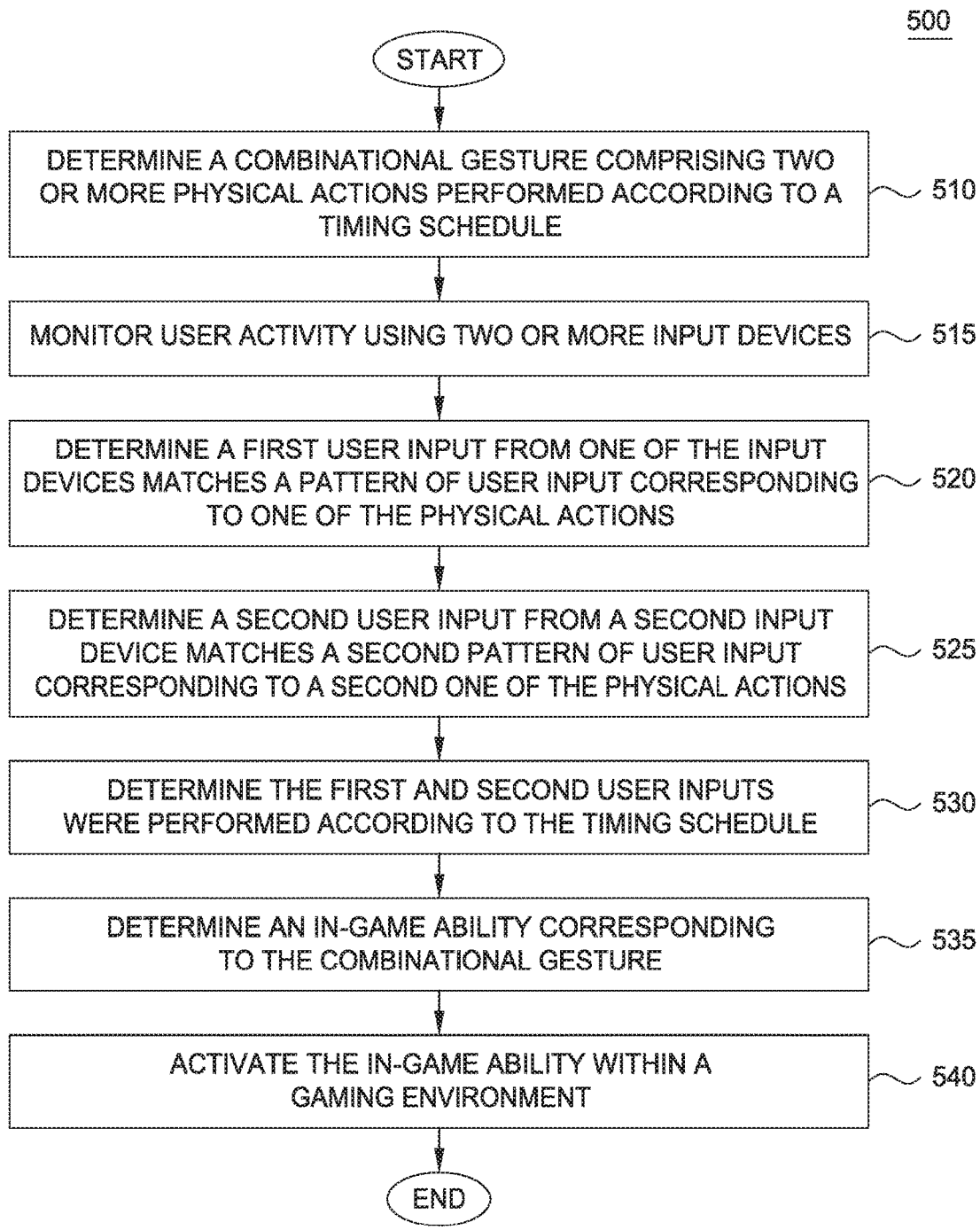
FIG. 5 is a flow diagram illustrating a method for activating an in-game ability based on successful performance of a combinational gesture, according to one embodiment described herein.

FIG. 5 is a flow diagram illustrating a method for activating an in-game ability based on successful performance of a combinational gesture, according to one embodiment described herein. As shown, the method 500 begins at block 510, where the game application 160 determines a combinational gesture comprising two or more physical actions performed according to a timing schedule. For example, the game application 160 could determine that a particular combinational gesture requires a user to first deflect a virtual laser beam by swiping a toy sword device at an appropriate time, and then requires the user to perform a gesture while wearing a fitness band, where the gesture corresponds to a telekinetic power in the computer game.

The game application 160 monitors user activity for the user using two or more input devices. For example, the game application 160 could collect IMU sensor data from a toy sword device held by the user, and could collect electromyograms from a fitness band worn by the user. The game application 160 determines that a first user input from one of the input devices matches a pattern of user input corresponding to one of the physical actions that make-up the combinational gesture (block 520). For example, the game application 160 could compare the IMU sensor data collected from the toy sword device to a predefined pattern of IMU sensor data (e.g., collected during repeated performances the physical action during a training phase) and could determine a measure of similarity between the two. The game application 160 could then determine that the IMU sensor data sufficiently matches the predefined pattern of sensor data, when the measure of similarity exceeds a predefined threshold measure of similarity.

Similarly, the game application 160 determines that the second user input from the second input device matches a second pattern of user input corresponding to a second physical action (block 525). For example, the game application 160 could compare an electromyogram received from the fitness band worn by the user, to a predefined pattern of electromyogram data corresponding to the second physical action, and could determine a measure of similarity between the two. The measure of similarity could then be used (e.g., by comparing the determined measure to a threshold measure of similarity) to determine whether the user has successfully performed the second physical action.

At block 530, the game application 160 determines that the first and second user inputs were performed according to a timing schedule for the combinational gesture. For example, such a timing schedule could be specified in a definition for the combination gesture (e.g., a set of data arranged in a predefined format for describing a combinational gesture). In doing so, the game application 160 could determine an amount of time that elapsed between the performance of the first physical action and the second physical action. For example, upon determining the physical gestures were performed too far apart, the game application 160 could determine that the combinational gesture was not successfully performed, even though the user performed each of the first and second physical actions correctly.

If the game application 160 determines that both the first and second physical actions were correct performed based on the user input, and determines that the first and second physical actions were performed according to the timing schedule, the game application 160 can determine that the combinational gesture was successfully performed. In the depicted embodiment, the game application 160 determines an in-game ability corresponding to the combinational gesture (block 535). The game application 160 activates the in-game ability within the gaming environment (block 540), and the method 500 ends. For example, the game application 160 could determine that a particular combinational gesture corresponds to a frost bolt spell and could cast the frost bolt spell within the virtual world of the computer game.

Figure 6:
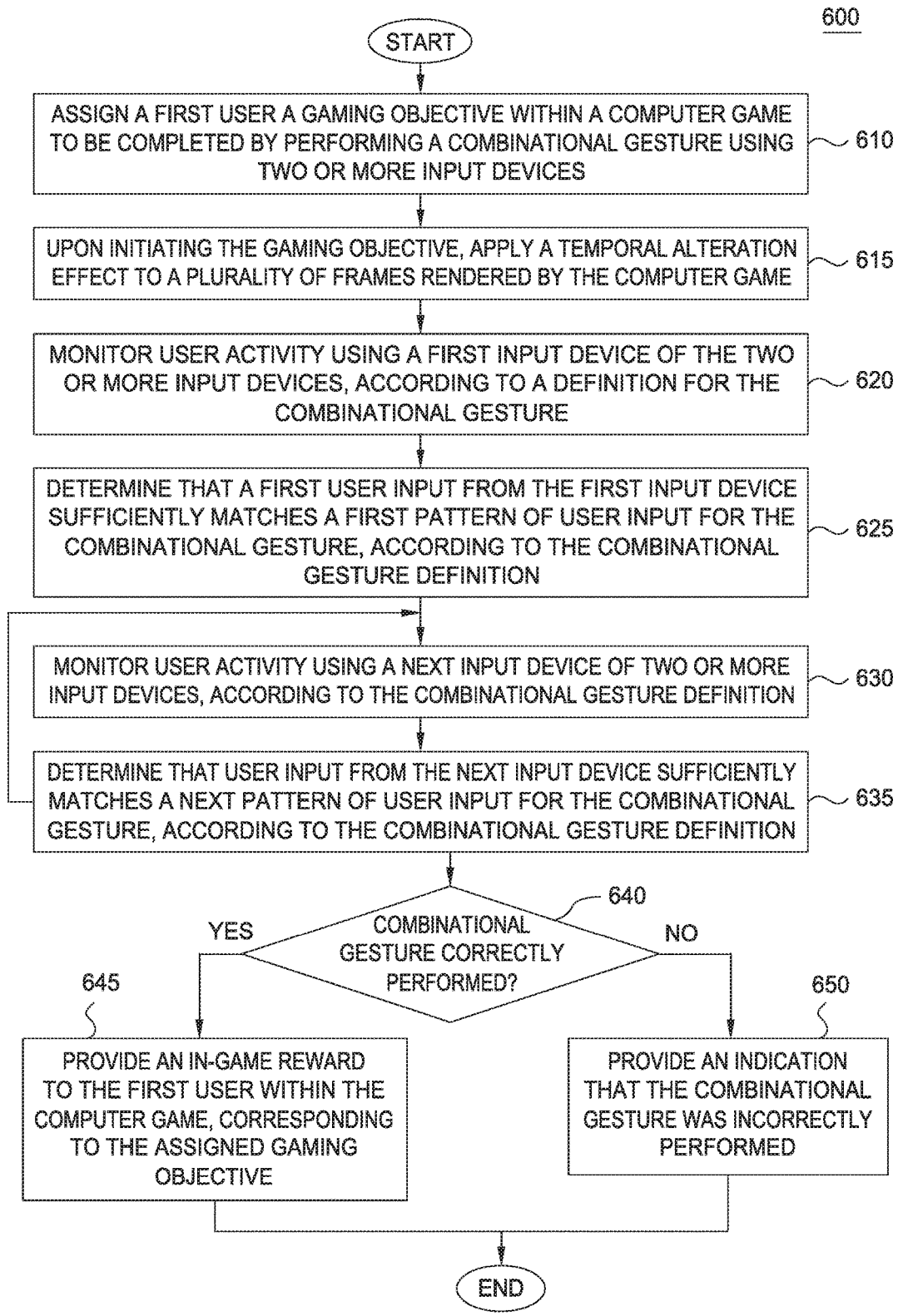
FIG. 6 is a flow diagram illustrating a method for rewarding a user within a computer-game based on successful performance of a combinational gesture, according to one embodiment described herein.

FIG. 6 is a flow diagram illustrating a method for rewarding a user within a computer-game based on successful performance of a combinational gesture, according to one embodiment described herein. As shown, the method 600 begins at block 610, where the game application 160 assigns a first user a gaming objective within a computer game to be completed by performing a combinational gesture using two or more input devices. For example, the game application 160 could assign the user the task of deflecting a virtual laser beam using a toy sword controller device, and then using a telekinetic ability with the user's other hand while wearing a fitness device.

Upon initiating the gaming objective, the game application 160 could apply a temporal alteration effect to a plurality of frames being rendered (block 615). For example, the game application 160 could reduce the rate at which virtual objects within the virtual world move by a predefined amount, creating a slow motion effect. For instance, in certain gaming situations, rendering virtual objects moving at full speed may not provide many users with enough time to perform the combinational gesture correctly, which can lead to an unacceptably high level of difficulty for the computer game. Moreover, having too little time to perform the gesture may cause users to rush through the movements involved in the combinational gesture, and such rushed movements may lead to inaccuracy in the analysis of the data collected from the sensor devices. Additionally, by selectively entering a "slow motion" state within the virtual world, the game application 160 can create the appearance of the user moving at super-human speeds, as the user begins moving significantly faster than the virtual characters. In one embodiment, the game application 160 is configured to modify the sound effects of the augmented reality environment to also be in slow motion, while simulating the "time slowing" effect in the virtual world. Doing so can provide the user with additional time in which to perform the combinational gesture, while giving the user the appearance of acting with super-human speed, thereby improving the immersiveness of the augmented reality environment.

The game application 160 monitors user activity using a first input device of the two or more input devices, according to a definition for the combinational gesture (block 620). As described above, such a definition could specify two or more physical activities to be performed for the combinational gesture, a respective pattern of sensor data for each of the two or more physical activities, and a timing schedule describing the required timing of the two or more physical activities. The game application 160 determines that a first user input from the first input device sufficiently matches a first pattern of user input for the combinational gesture, according to the definition (block 625). For example, the game application 160 could compare the user input data with the predefined pattern of sensor data and could determine a measure of difference between the two sets of data. The game application 160 could then determines that the input sufficiently matches the predefined pattern of data, when the determined difference does not exceed a predefined threshold level of difference.

At block 630, the game application 160 monitors user activity using a next input device of the two or more input devices, according to the combinational gesture definition. The game application 160 determines that user input from the next input device sufficiently matches the next pattern of user input according to the definition (block 635). For example, the game application 160 could collect EMG sensor data from a fitness band worn by the user, and could determine when the user has performed a gesture that sufficiently matches a predefined pattern of EMG sensor data. The method 600 can then repeat the block 630 and 635, for as many input devices and patterns of user input are specified within the definition for the combinational gesture. If at any point the game application 160 determines the user has not correctly performed the next physical action required to complete the combinational gesture, the game application 160 could alter one or more aspects of the gaming environment to reflect the failure to perform the combinational gesture. For example, a virtual character could notify the user that the combinational gesture was not performed correctly and could encourage the user to try again. The method 600 could then restart at block 610, where the user is again assigned the gaming objective to perform a combinational gesture.

Once the game application 160 determines that the user has correctly performed all of the physical actions specified in the definition, the game application 160 determines whether the combinational gesture has been correctly performed (block 640). For example, the game application 160 could compare timing information describing when the physical actions were performed with a timing schedule for the combinational gesture. If the game application 160 determines that one or more of the physical actions was not performed according to the timing schedule, the game application 160 could determine the gesture was incorrectly performed and could provide an indication that the gesture was incorrectly performed (block 650), at which point the method 600 ends. In such a scenario, for example, a virtual character could notify the user that the combinational gesture was not performed correctly and could encourage the user to try again. The method 600 could then restart at block 610, where the user is again assigned the gaming objective to perform a combinational gesture.

If the game application 160 determines the combinational gesture was correctly performed, the game application 160 could provide an in-game reward to the first user, corresponding to the assigned gaming objective (block 645), and the method 600 ends. For example, upon determining that the user has completed a particular gaming objective by successfully blocking a virtual laser beam by swinging the toy sword device, and then attacking a virtual enemy with a telekinetic ability executed by performing a defined gesture, the game application 160 could grant the user a defined number of experience within the computer game. Doing so provides a more interactive and immersive gaming experience for the user through the use of combinational gestures.

Technical Description

Figure 7:
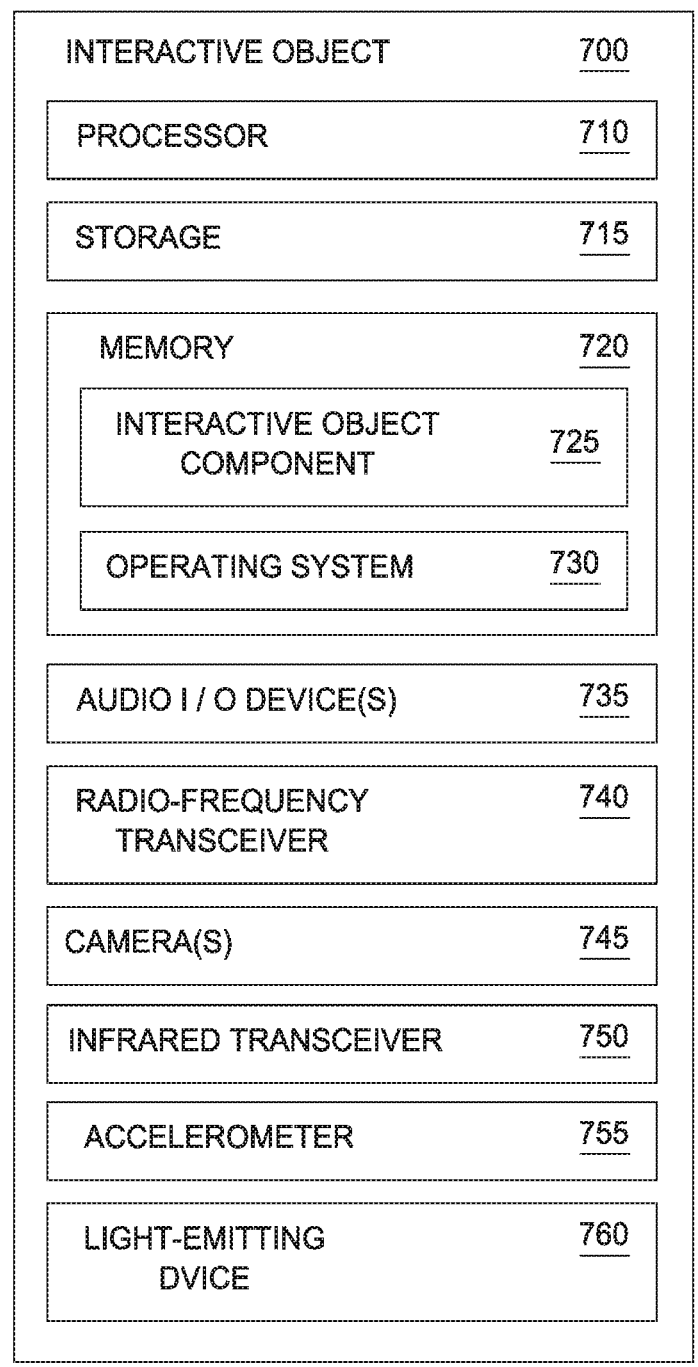
FIG. 7 is a block diagram illustrating an interactive object, according to one embodiment described herein.

An example of an interactive device is shown in FIG. 7, which is a block diagram illustrating an interactive device configured with an interactive object component, according to one embodiment described herein. In this example, the device 700 includes, without limitation, a processor 710, storage 715, memory 720, audio input/output (I/O) device(s) 735, a radio-frequency (RF) transceiver 740, a camera device(s) 745, an infrared transceiver 750, an accelerometer device 755, and a light-emitting device 760. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the interactive object component 725 to connect to a data communications network (e.g., wired Ethernet connection or an 802.11 wireless network). As discussed above, the interactive device may include one or more battery devices (not shown).

Further, while the depicted embodiment illustrates the components of a particular interactive device, one of ordinary skill in the art will recognize that interactive devices may use a variety of different hardware architectures. For instance, in one embodiment the controller component logic is implemented as hardware logic. Examples of such hardware logic include, without limitation, an application-specific integrated circuit (ASIC) and a field-programmable gate array (FPGA). Moreover, it is explicitly contemplated that embodiments may be implemented using any device or computer system capable of performing the functions described herein.

Returning to the embodiment depicted in FIG. 7, the memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the interactive device 700. Illustratively, the memory 720 includes an interactive object component 725 and an operating system 730. The interactive object component 725 could be configured to receive commands (e.g., encoded in RF or infrared signals) and to execute the commands to perform audiovisual effects. In one embodiment, the interactive object component 725 is configured to decrypt the commands using a received key before executing the commands. The operating system 730 generally controls the execution of application programs on the interactive device 700. Examples of operating system 730 include UNIX, a version of the Microsoft Windows® operating system, and distributions of the Linux® operating system. Additional examples of operating system 730 include custom operating systems for gaming consoles, including the custom operating systems for systems such as the Nintendo DS® and Sony PSP®.

The infrared transceiver 750 represents any device capable of sending and receiving infrared signals. In another embodiment, a device 700 that only sends or receives infrared signals may be configured with an infrared transmitter or a infrared receiver, respectively, as opposed to the infrared transceiver 750. The sound I/O devices 735 could include devices such as microphones and speakers. For example, the speakers could be used to produce sound effects (e.g., explosion sound effects, dialogue, etc.) and/or to produce vibration effects.

Generally, the interactive object component 725 provides logic for the interactive device 700. For example, the interactive object component 725 could be configured to detect that a coded infrared signal has been received (e.g., using the infrared transceiver 750). The interactive object component 725 could then determine a type of the infrared signal (e.g., based on data specified within the coded infrared signal) and could determine a corresponding response based on determined type. For example, the interactive object component 725 could determine that the infrared signal specifies that a ray blast sound effect should be played, and, in response, could output the specified sound effect using audio I/O devices 735. As another example, the signal could be encoded with data specifying that a particular lighting effect should be displayed according to a specified schedule (e.g., at a particular point in time), and the interactive object component 725 could monitor the schedule (e.g., using an internal clock) and could activate the appropriate light-emitting device 760 at the appropriate time.

Figure 8:
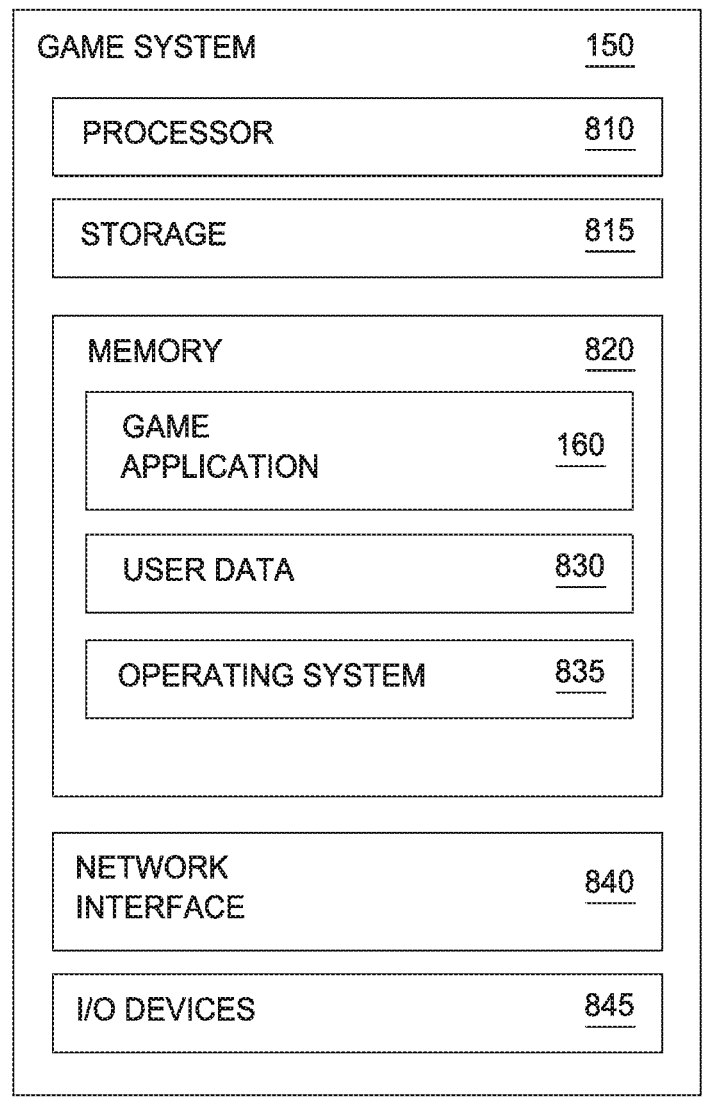
FIG. 8 is a block diagram illustrating a game system, according to one embodiment described herein.

FIG. 8 illustrates an example of a gaming system, according to one embodiment described herein. As shown, the gaming system 150 includes a processor 810, storage 815, memory 820, a network interface 840 and input/output devices 845. Generally, the processor 810 retrieves and executes programming instructions stored in the memory 820. Processor 810 is included to be representative of a single CPU, multiple CPUs, a single CPU having multiple processing cores, GPUs having multiple execution paths, and the like. The memory 820 is generally included to be representative of a random access memory. The network interface 840 enables the gaming system 150 to transmit and receive data across a data communications network. Further, while the depicted embodiment illustrates the components of a particular gaming system 150, one of ordinary skill in the art will recognize that interactive objects may use a variety of different hardware architectures. Moreover, it is explicitly contemplated that embodiments may be implemented using any device or computer system capable of performing the functions described herein.

The memory 820 represents any memory sufficiently large to hold the necessary programs and data structures. Memory 820 could be one or a combination of memory devices, including Random Access Memory, nonvolatile or backup memory (e.g., programmable or Flash memories, read-only memories, etc.). In addition, memory 820 and storage 815 may be considered to include memory physically located elsewhere; for example, on another computer communicatively coupled to the controller device 800. Illustratively, the memory 820 includes a controller component 825, user data 830 and an operating system 835. The operating system 835 generally controls the execution of application programs on the controller device 800. Examples of operating system 835 include UNIX, a version of the Microsoft Windows® operating system, and distributions of the Linux® operating system. Additional examples of operating system 835 include custom operating systems for gaming consoles, including the custom operating systems for systems such as the Nintendo DS® and Sony PSP®.

Figure 9:
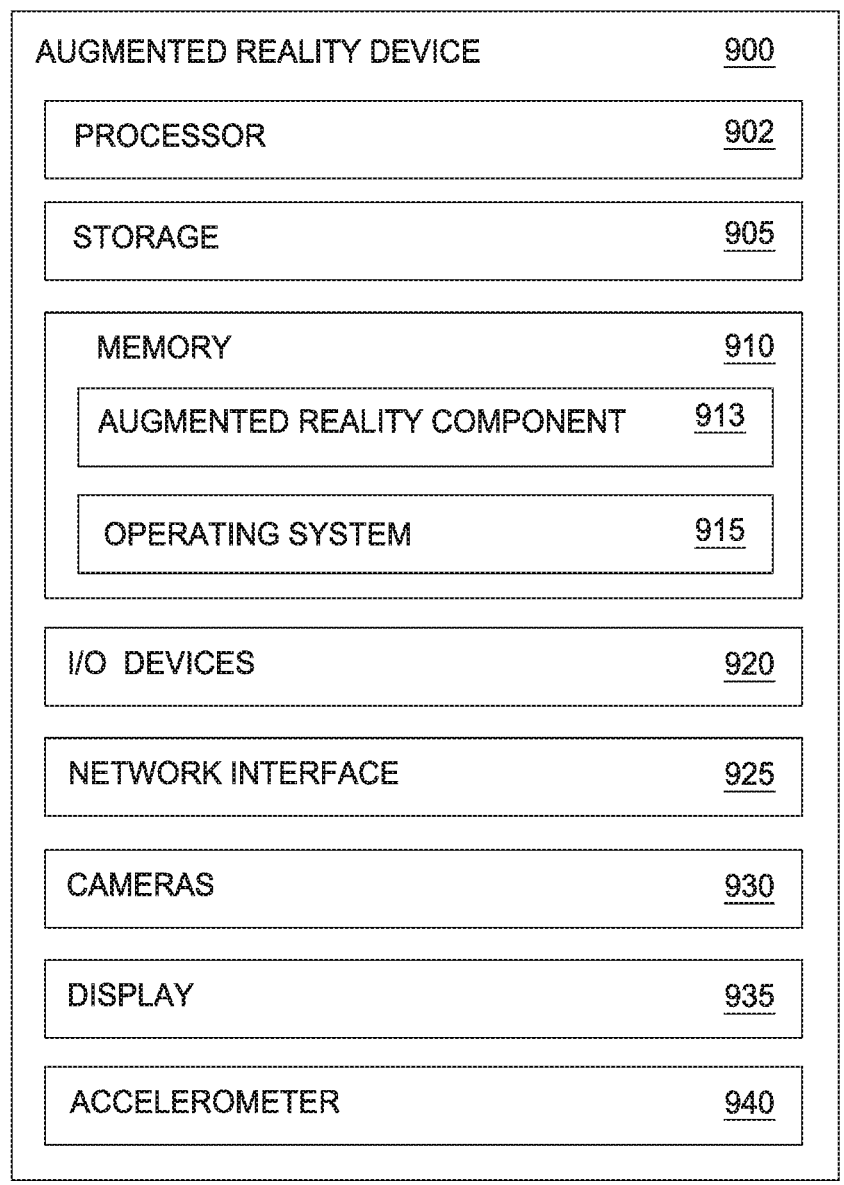
FIG. 9 is a block diagram illustrating a mobile device configured with an augmented reality component, according to one embodiment described herein.

FIG. 9 is a block diagram illustrating a mobile device configured with an augmented reality component, according to one embodiment described herein. In this example, the mobile device 900 includes, without limitation, a processor 902, storage 905, memory 910, I/O devices 920, a network interface 925, camera devices 930, a display devices 935 and an accelerometer device 940. Generally, the processor 902 retrieves and executes programming instructions stored in the memory 910. Processor 902 is included to be representative of a single CPU, multiple CPUs, a single CPU having multiple processing cores, GPUs having multiple execution paths, and the like. The memory 910 is generally included to be representative of a random access memory. The network interface 925 enables the mobile device 900 to connect to a data communications network (e.g., wired Ethernet connection or an 802.11 wireless network). Further, while the depicted embodiment illustrates the components of a particular mobile device 900, one of ordinary skill in the art will recognize that augmented reality devices may use a variety of different hardware architectures. Moreover, it is explicitly contemplated that embodiments of the invention may be implemented using any device or computer system capable of performing the functions described herein.

The memory 910 represents any memory sufficiently large to hold the necessary programs and data structures. Memory 910 could be one or a combination of memory devices, including Random Access Memory, nonvolatile or backup memory (e.g., programmable or Flash memories, read-only memories, etc.). In addition, memory 910 and storage 905 may be considered to include memory physically located elsewhere; for example, on another computer communicatively coupled to the mobile device 900. Illustratively, the memory 910 includes an augmented reality component 913 and an operating system 915. The operating system 915 generally controls the execution of application programs on the augmented reality device 900. Examples of operating system 915 include UNIX, a version of the Microsoft Windows® operating system, and distributions of the Linux® operating system. Additional examples of operating system 915 include custom operating systems for gaming consoles, including the custom operating systems for systems such as the Nintendo DS® and Sony PSP®.

The I/O devices 920 represent a wide variety of input and output devices, including displays, keyboards, touch screens, and so on. For instance, the I/O devices 920 may include a display device used to provide a user interface. As an example, the display may provide a touch sensitive surface allowing the user to select different applications and options within an application (e.g., to select an instance of digital media content to view). Additionally, the I/O devices 920 may include a set of buttons, switches or other physical device mechanisms for controlling the augmented reality device 900. For example, the I/O devices 920 could include a set of directional buttons used to control aspects of a video game played using the augmented reality device 900.

Figure 10:
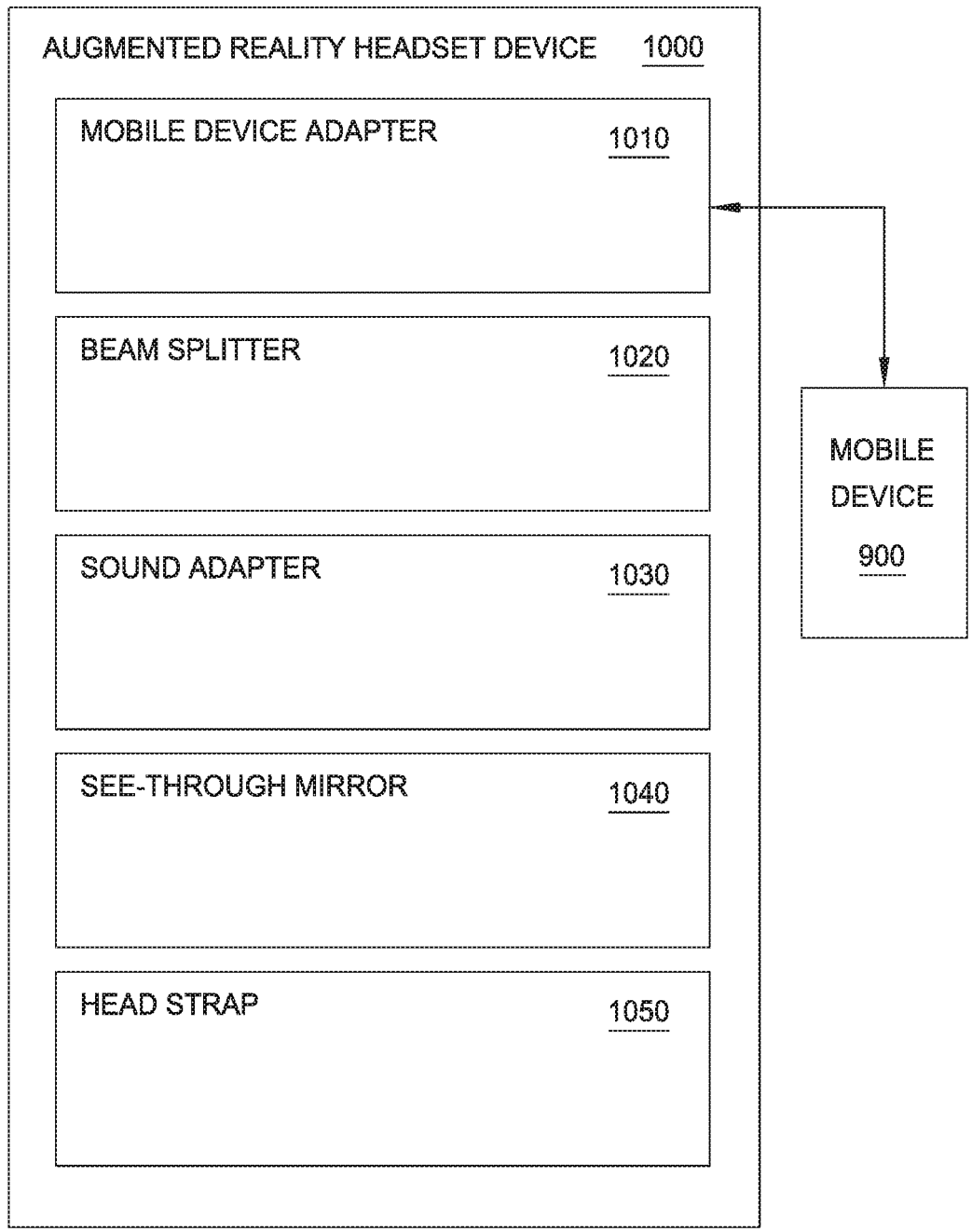
FIG. 10 is a block diagram illustrating an augmented reality headset, according to one embodiment described herein.

FIG. 10 is a block diagram illustrating an augmented reality headset, according to one embodiment described herein. The augmented reality headset 1000 includes a mobile device adapter 1010, a beam splitter 1020, a sound adapter 1030, a see-through mirror 1040 and a headstrap 1050. Generally, the augmented reality headset device 1000 is configured to interface with a mobile device 900, by way of the mobile device adapter 1010. For example, the mobile device adapter 1010 could be a slot within the augmented reality headset 1000 configured to hold the mobile device 900. The beam splitter 1020 and see-through mirror 1040 are generally arranged in such a way as to project light from the display device 935 of the mobile device 900 to the user's eyes, when the user views the physical environment while wearing the augmented reality headset 1000. For example, the beam splitter 1020 and see-through mirror 1040 could be arranged in the configuration shown in FIG. 3B and discussed above. More generally, however, any configuration suitable for providing an augmented reality display using the light from the display device 935 of the mobile device 900 can be used, consistent with the functionality described herein. The headstrap 1050 generally is used to secure the augmented reality headset 900 to the user's head. More generally, however, any mechanism (e.g., temples that rest atop the user's ears) for securing the augmented reality headset 900 can be used.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

Additional embodiments are described in the attached Appendices A-D, which are hereby incorporated by reference in their entirety. While the foregoing is directed to embodiments of the present invention, other and further embodiments of the invention may be devised without departing from the basic scope thereof, and the scope thereof is determined by the claims that follow.

What is claimed is:

1. A method, comprising:
retrieving a definition for a combinational gesture within a computer game, the definition specifying two or more physical actions that are performed according to a specified timing schedule in order to successfully perform the combinational gesture;
rendering a first plurality of frames depicting a plurality of virtual objects within a virtual world, wherein a first virtual object of the plurality of virtual objects is moving at a first rate within the virtual world;
monitoring user activity using two or more input devices;
detecting performance of the combinational gesture, comprising:
  detecting that a first user input from a first of the two or more input devices sufficiently matches a first predefined pattern of user input corresponding to a first one of the two or more physical actions;
  detecting that a second user input from a second of the two or more input devices sufficiently matches a second predefined pattern of user input corresponding to a second one of the two or more physical actions; and
  determining that the combinational gesture was successfully performed, based on determining that the first user input and the second user input were successfully performed within a predefined window of time as defined by the timing schedule specified in the definition; and
altering a status of at least one aspect of a virtual world for the computer game, based on the detected performance of the combinational gesture, comprising:
  determining that a first user has successfully deflected a first virtual object of the plurality of virtual objects, by analyzing the first user input and positional information for the first input device, relative to positional information of the first virtual object;
  performing an in-game ability within the virtual world to alter a virtual rate of movement of a second virtual object of the plurality of virtual objects, based on the second user input; and
  rendering a second plurality of frames depicting the first virtual object traveling at a second velocity as a result of the deflection and the performance of the in-game ability.

2. The method of claim 1, further comprising:
rendering a first plurality of frames depicting a plurality of virtual objects, each moving at a respective first rate within a virtual world of the computer game; and
outputting the first plurality of frames for display.

3. The method of claim 2, further comprising:
responsive to determining that a predefined criteria has been satisfied, rendering a second plurality of frames depicting the plurality of virtual objects, each moving at a respective second rate, wherein the second rate for each of the plurality of virtual objects is slower than the first rate for the virtual object; and
outputting the second plurality of frames for display.

4. The method of claim 3, wherein the predefined criteria comprises a determination that at least one plurality of virtual objects is moving within the virtual world at a rate that exceeds a predefined threshold rate.

5. The method of claim 3, wherein the second rate for each of the plurality of virtual objects comprise the first rate for the virtual object reduced by a defined percentage.

6. The method of claim 3, wherein the predefined criteria comprises detecting that the first user input matches the first predefined pattern of user input.

7. The method of claim 2, further comprising:
upon determining that the first and second user inputs were performed according to the timing scheduled specified in the definition:
determining that the combinational gesture was successfully completed;
rendering a third plurality of frames depicting the plurality of virtual objects, each moving at the respective first rate; and
outputting the third plurality of frames for display.

8. The method of claim 2, wherein the rendered first plurality of frames further depict the performance of the in-game ability within the virtual world.

9. The method of claim 1, wherein the timing schedule specified in the definition for the combinational gesture specifies a window of time in which the two or more physical actions must be successfully performed, in order for the combinational gesture to be successfully performed.

10. The method of claim 9, wherein the first physical action is successfully performed upon detecting that the first user input from the first input device matches the first predefined pattern of user input, and wherein the second physical action is successfully performed upon detecting that the second user input from the second input device matches the second predefined pattern of user input.

11. The method of claim 1, wherein a first virtual object comprises a virtual laser beam moving at a first velocity.

12. The method of claim 1, wherein the in-game ability comprises a telekinetic power within the virtual world.

13. The method of claim 1, wherein altering the status of the at least one aspect of the virtual world for the computer game, based on performance of the combinational gesture, further comprises:
determining an in-game ability within the computer game corresponding to the combinational gesture; and
performing the in-game ability within a virtual world of the computer game.

14. The method of claim 1, wherein altering the status of the at least one aspect of the virtual world for the computer game, based on performance of the combinational gesture, further comprises:
determining an in-game reward within the computer game corresponding to the combinational gesture; and
granting the in-game reward to a first user avatar within the computer game.

15. The method of claim 14, wherein the in-game reward comprises at least one of (i) a measure of experience points, (ii) a virtual item, (iii) a virtual ability, (iv) a virtual follower or pet, (v) an in-game title and (vi) a virtual currency reward, to grant the first user within the computer game.

16. The method of claim 1, wherein the two or more input devices include at least one device configured with one or more of (i) an accelerometer sensor, (ii) an inertial measurement unit (IMU) sensor, (iii) a camera sensor, (iv) a microphone sensor, and (v) an electromyography sensor.

17. A non-transitory computer-readable medium containing computer program code that, when executed by operation of one or more computer processors, performs an operation comprising:
retrieving a definition for a combinational gesture within a computer game, the definition specifying two or more physical actions that are performed according to a specified timing schedule in order to successfully perform the combinational gesture;
rendering a first plurality of frames depicting a plurality of virtual objects within a virtual world, wherein a first virtual object of the plurality of virtual objects is moving at a first rate within the virtual world;
monitoring user activity using two or more input devices;
detecting performance of the combinational gesture, comprising:
detecting that a first user input from a first of the two or more input devices sufficiently matches a first predefined pattern of user input corresponding to a first one of the two or more physical actions;
detecting that a second user input from a second of the two or more input devices sufficiently matches a second predefined pattern of user input corresponding to a second one of the two or more physical actions; and
determining that the combinational gesture was successfully performed, based on determining that the first user input and the second user input were successfully performed within a predefined window of time as defined by the timing schedule specified in the definition; and
altering a status of at least one aspect of a virtual world for the computer game, based on the detected performance of the combinational gesture, comprising:
determining that a first user has successfully deflected a first virtual object of the plurality of virtual objects, by analyzing the first user input and positional information for the first input device, relative to positional information of the first virtual object;
performing an in-game ability within the virtual world to alter a virtual rate of movement of a second virtual object of the plurality of virtual objects, based on the second user input; and
rendering a second plurality of frames depicting the first virtual object traveling at a second velocity as a result of the deflection and the performance of the in-game ability.

18. A system, comprising:
one or more computer processors; and
a non-transitory memory containing computer program code that, when executed by operation of one or more computer processors, performs an operation comprising:
retrieving a definition for a combinational gesture within a computer game, the definition specifying two or more physical actions that are performed according to a specified timing schedule in order to successfully perform the combinational gesture;
rendering a first plurality of frames depicting a plurality of virtual objects within a virtual world, wherein a first virtual object of the plurality of virtual objects is moving at a first rate within the virtual world;
monitoring user activity using two or more input devices;
detecting performance of the combinational gesture, comprising:
    detecting that a first user input from a first of the two or more input devices sufficiently matches a first predefined pattern of user input corresponding to a first one of the two or more physical actions;
    detecting that a second user input from a second of the two or more input devices sufficiently matches a second predefined pattern of user input corresponding to a second one of the two or more physical actions; and
    determining that the combinational gesture was successfully performed, based on determining that the first user input and the second user input were successfully performed within a predefined window of time as defined by the timing schedule specified in the definition; and
altering a status of at least one aspect of a virtual world for the computer game, based on the detected performance of the combinational gesture, comprising:
    determining that a first user has successfully deflected a first virtual object of the plurality of virtual objects, by analyzing the first user input and positional information for the first input device, relative to positional information of the first virtual object;
    performing an in-game ability within the virtual world to alter a virtual rate of movement of a second virtual object of the plurality of virtual objects, based on the second user input; and
    rendering a second plurality of frames depicting the first virtual object traveling at a second velocity as a result of the deflection and the performance of the in-game ability.

\* \* \* \* \*